Figure 1:
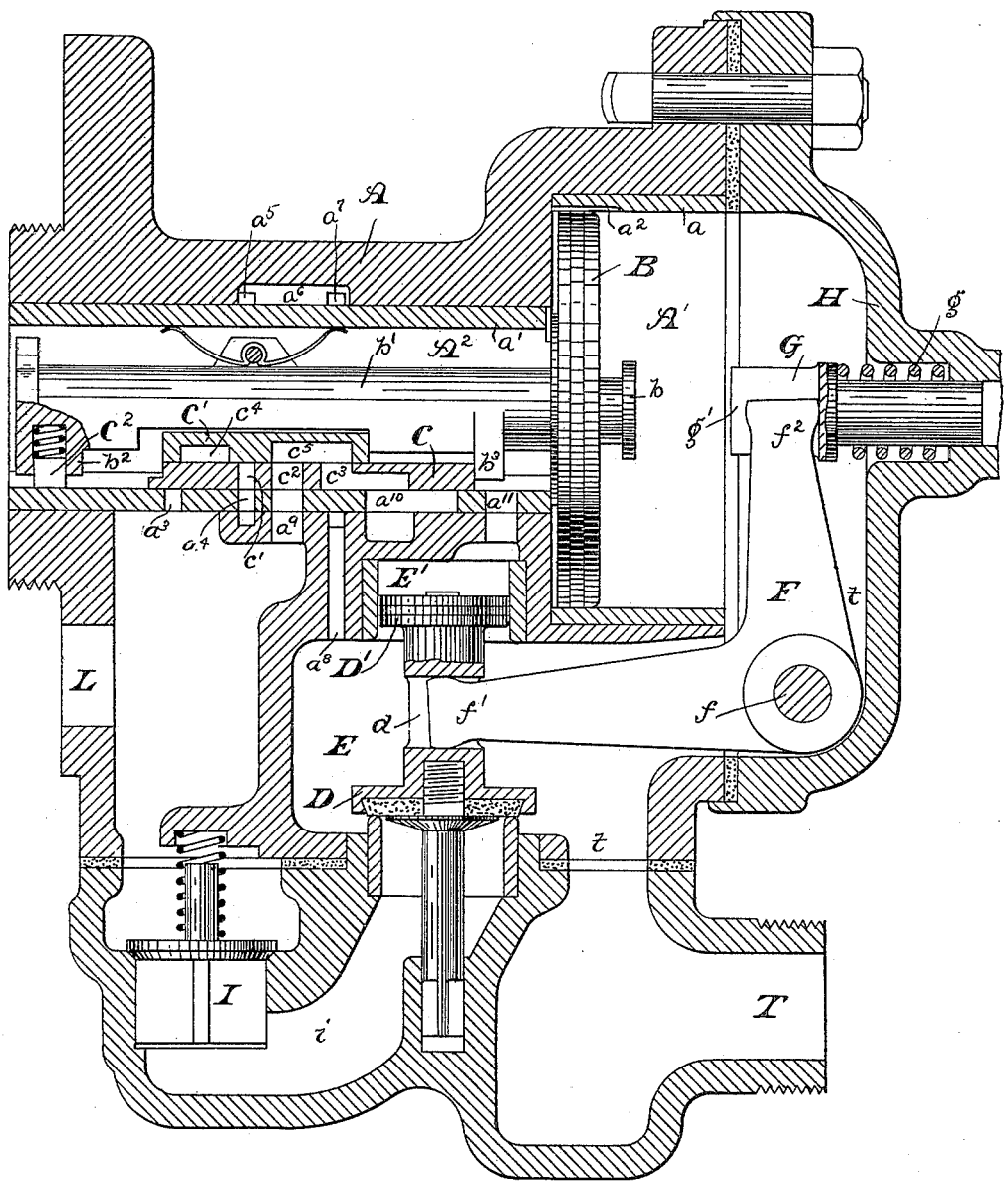

(No Model.)　　　　　　　　　　　　　　　　　　　2 Sheets—Sheet 2.
H. F. NOYES.
AIR BRAKE.

No. 599,348.　　　　　　　　　　　　Patented Feb. 22, 1898.

Witnesses
Jennie Larsen
F. H. Smith

Inventor
Henry F. Noyes

UNITED STATES PATENT OFFICE.

HENRY F. NOYES, OF ELGIN, ILLINOIS, ASSIGNOR TO THE WESTINGHOUSE AIR BRAKE COMPANY, OF PITTSBURG, PENNSYLVANIA.

AIR-BRAKE.

SPECIFICATION forming part of Letters Patent No. 599,348, dated February 22, 1898.

Application filed March 27, 1895. Renewed July 21, 1897. Serial No. 645,447. (No model.)

*To all whom it may concern:*

Be it known that I, HENRY F. NOYES, of Elgin, Kane county, Illinois, have invented certain new and useful Improvements in Air-Brakes, of which the following is a specification.

The object of my invention is to provide a simple, efficient, economical, and automatic triple valve especially adapted to be connected with the air-brake system now in use, familiarly known as the "Westinghouse" system; and the invention consists in the features and combinations hereinafter described and claimed.

In the application of the Westinghouse automatic brake as heretofore and at present commonly in use each car is provided with a train-pipe, an auxiliary reservoir, a brake-cylinder, and a triple valve, the triple valve having three connections—to wit, one to the train-pipe, one to the auxiliary reservoir, and one to the brake-cylinder. The train-pipe has a stopcock at or near each of its ends to be opened or closed, as required, and is fitted with flexible connections and couplings for connecting the pipes from car to car of a train, so as to form a continuous line for the transmission of compressed air from a main reservoir supplied by an air-pump on the engine. When the brakes are off or released, but in readiness for action upon the wheels of the train, the air which fills the train-pipe has a pressure of seventy pounds to the square inch, and by reason of the connections referred to the same pressure is exerted in the casings of the triple valves on both sides of their pistons and in the auxiliary reservoirs connected therewith. At the same time passages called "release-ports" are open from the brake-cylinders to the atmosphere. When it is desired to apply the brakes, a slight reduction of pressure in the train-pipe is made, which acts to admit air-pressure from the auxiliary reservoir to the brake-cylinder sufficient for an ordinary or service stop. For an emergency stop in order to apply the brakes with greater force a further reduction of pressure in the train-pipe acts to admit air from both the auxiliary reservoir and train-pipe directly to the brake-cylinder. To release the brakes, the train-pipe pressure is raised, which acts to close all communications between the train-pipe, auxiliary reservoir, and brake-cylinder, and to open communication between the brake-cylinder and the outer air.

In a service application of a triple valve it is an advantage and almost as much of a necessity that the successive triples of a train should act with great rapidity as when an emergency application is desired, this necessity becoming more urgent the greater the length of the train. In the present system this requirement is not fully met, as the air at the last triple must be set in motion and travel the whole length of the train-pipe to the engineer's valve. In my improvement this feature is improved by making a preliminary admission of pressure to each brake-cylinder from the train-pipe, and this admission causes a local reduction of pressure in the vicinity of each triple sufficient to operate it to admit pressure from auxiliary reservoir to the brake-cylinder, so that starting from the engine each triple acts on the next, and so on. As soon as one triple has admitted enough pressure from the train-pipe to the brake-cylinder to reduce the train-pipe pressure a certain amount further admission from the train-pipe is shut off and admission from the auxiliary reservoir takes place until the graduating-valve cuts off or the pressures equalize. This is the principle of my invention.

Figure 2:
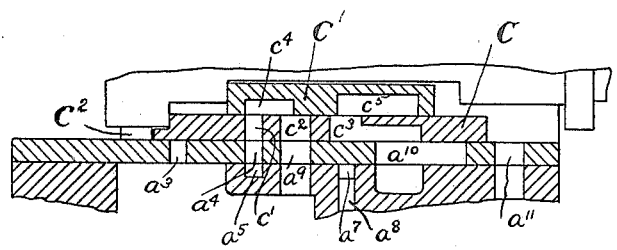
Figure 3:
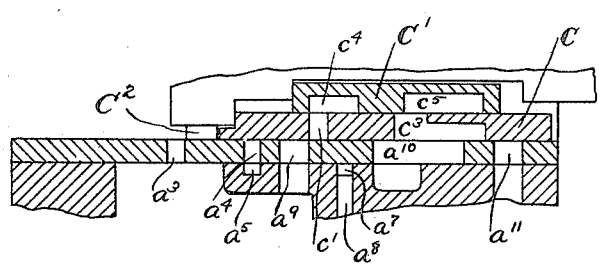
Figure 4:
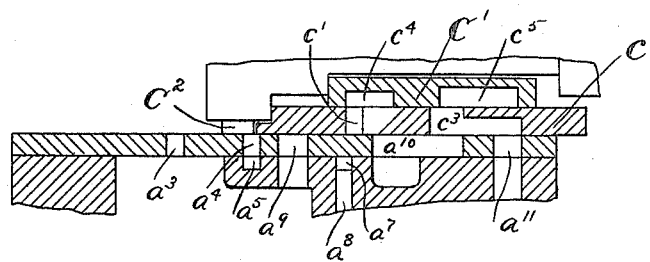

In the drawings, Figure 1 is a vertical sectional elevation showing the valves and piston in running position. Fig. 2 is a detail of the valves after preliminary travel of the piston to admit pressure from the train-pipe to the brake-cylinder; Fig. 3, the position taken when admitting pressure from the auxiliary reservoir to the brake-cylinder, and Fig. 4 for an emergency application.

Referring to the drawings, I provide a main casing $A$, having bushings $a$ and $a'$, forming the chambers $A'$ and $A^2$, respectively. In chamber $A'$ works piston $B$, provided with the stem $b$ on one side and $b'$ on the other. In the chamber $A^2$ work the slide-valves $C$ and $C'$ and the graduating-valve $C^2$. These valves control ports through the bushing leading to connections with the brake-cylinder, atmosphere, auxiliary reservoir, and train-pipe.

The bushing $a'$ has the ports $a^3$ leading to the brake-cylinder. $a^4$ connects with a circular groove $a^5$, which is turned in the main casing, and a similar groove $a^7$ is connected with $a^5$ by the channel $a^6$ and with the train-pipe chamber E by the port $a^8$. Port $a^9$ leads to the brake-cylinder, port $a^{10}$ to the atmosphere, and $a^{11}$ to chamber E', in which works emergency-valve D. Valve C has the ports or openings $c'$, $c^2$, and $c^3$, and valve C' the channel $c^4$, adapted to connect ports $c'$ and $c^2$, and channel $c^5$, adapted to connect ports $c^2$ and $c^3$. Valve $C^2$ acts as a graduating-valve to close port $a^3$. After a service application of the brakes has been made and the auxiliary-reservoir pressure is reduced below that in the train-pipe the piston returns far enough to take up the play allowed valve C' by its stem. Chamber E is connected directly with the train-pipe and contains emergency-valve D, adapted to control emergency-passage $i$, which contains check-valve I, adapted to prevent the return of air from the brake-cylinder. This emergency-valve has at one end the piston-head D', working in the chamber E', and exposed in this chamber to auxiliary-reservoir pressure through port $a^{11}$. This head is made of such an area that when the pressure in chamber E' is released the downward pressure upon the valve D will be just balanced by upward pressure upon its head D'. The valve-stem $d$ is provided with a slot adapted to fit one end $f'$ of the lever F. This lever oscillates on the bearing or shaft $f$, and its arm $f^2$ bears against the plunger G. This plunger is pressed against this arm of the lever by the spring $g$. This pressure also, being transmitted by the lever to the valve D, acts in conjunction with auxiliary pressure in chamber E' to hold it to its seat. The plunger-head $g'$ is slotted to receive the lever end $f^2$ and extends beyond the lever far enough to form a stop to travel of the piston B before the stem $b$ has reached arm $f^2$, this stopping the piston in the position required for a service application, as shown by Fig. 3.

The operation of the mechanism is as follows: Fig. 1 shows the valves in "running position" when train-pipe pressure passing through openings $t\,t$ to chamber A' past piston B by groove $a^2$ keeps the auxiliary reservoir, which is connected with chamber $A^2$, up to the required pressure. For a service application a reduction of train-pipe pressure of about three pounds operates the piston to move to the right, carrying valve C' with it until the projecting flange $b^2$ of the piston-stem strikes valve C. As valve C has a much larger area than valve C', it is held to its seat by a greater pressure and requires a greater pressure to move it. The difference of pressures on the two sides of the piston not being sufficient to accomplish this its motion is checked, leaving the valves in the position shown in Fig. 2, which allows train-pipe pressure to feed through ports $a^3$, channels $a^7$, $a^6$, and $a^5$, port $a^4$, channel $c^4$, and ports $c^2$ and $a^9$ through opening L to the brake-cylinder, and this admission continues until the train-pipe pressure is reduced two or three pounds further, when the difference of pressures on the two sides of the piston is sufficient to overcome the friction of valve C on its seat, and the piston and valves move farther to the right until its stem $b$ strikes the plunger G, when the resistance of the spring $g$ prevents further travel. The valves are now in the position shown in Fig. 3, admission of train-pipe pressure being cut off, and auxiliary-reservoir pressure feeds through port $a^3$ until reduced below train-pipe pressure, and the piston and valve $C^2$ return far enough to close port $a^3$ and retain the pressure in the brake-cylinder. To release the brakes, raising the train-pipe pressure acts to return the piston and valves to the positions shown in Fig. 1, when pressure from the brake-cylinder passes through ports $a^9$, $c^2$, $c^5$, $c^3$, and $a^{10}$ to the atmosphere.

It is evident that while a reduction of about three pounds is sufficient to operate the valve a reduction of six pounds by the engineer would accomplish the same thing, but would not be so economical nor cause such quick action. At the same time this allows the valve to act in conformity with the systems now in use when necessary.

When an emergency application is desired, a reduction of train-pipe pressure of about ten or twelve pounds moves the piston to the right with sufficient power to overcome the resistance of spring $g$. Before the stem $b$ strikes lever end $f^2$ port $c^3$ of valve C has connected ports $a^{11}$ and $a^{10}$, thus allowing auxiliary-reservoir pressure to escape from chamber E' and relieve the valve D from such pressure, and as the piston B continues its travel to the end of its stroke it carries arm $f^2$ with it, thus actuating the lever F to open valve D and allow train-pipe pressure to rush directly into the brake-cylinder in large volume by lifting valve I. A release is obtained as before.

I am aware that a construction involving a valve controlling ports for the communication of the train-pipe with the brake-cylinder and of the brake-cylinder with the exhaust and a second valve upon the admission of the train-pipe pressure to the brake-cylinder, then admitting the auxiliary-reservoir pressure to the brake-cylinder through a suitable port has been heretofore proposed, and such construction, which involves an operation different from my invention, therefore, I hereby disclaim.

Thus it will be seen that the advantages of my improved valve are economy in the use of air and rapidity of action, simplicity of construction, and interchangeability with the systems now in vogue.

While I have described my invention with considerable minuteness as regards the details thereof and as being embodied in more or less precise form, I do not desire to be limited thereto unduly, as I contemplate all proper changes in form, omission of parts, and substitution of equivalents as circumstances may suggest or necessity render expedient.

I claim—

1. In a triple-valve device, the combination of a casing, a main valve and an auxiliary valve working in such casing, the preliminary traverse of such auxiliary valve in making an application of the brakes adapted to effect an admission of pressure from a train-pipe to a brake-cylinder sufficient to effect its further traverse in the same direction, and said auxiliary valve in conjunction with such main valve adapted to control communication between a brake-cylinder and the atmosphere, substantially as described.

2. In a brake mechanism, the combination of an auxiliary reservoir, a train-pipe, a brake-cylinder and a triple valve provided with a piston-valve, normally exposed to pressure from the auxiliary reservoir, and actuated directly by the triple-valve piston, when the piston-valve is released of such auxiliary-reservoir pressure by its escape to the atmosphere to admit pressure from the train-pipe directly to the brake-cylinder, substantially as described.

3. In a brake mechanism, the combination of an auxiliary reservoir, a train-pipe, a brake-cylinder and a triple valve provided with a main valve, operated by the triple-valve piston, and a piston-valve, normally exposed to auxiliary-reservoir pressure, and actuated by the piston-stem, when the main valve releases such auxiliary-reservoir pressure from the piston-valve to the atmosphere, to admit pressure from the train-pipe directly to the brake-cylinder, substantially as described.

4. In a triple-valve device, the combination of a casing, a piston provided with a stem and working in a chamber of said casing, a main valve operated by the piston-stem, and a piston-valve normally exposed to pressure from an auxiliary reservoir, and a lever operated by the piston-stem and adapted to operate the piston-valve, when said piston-valve is released of such auxiliary-reservoir pressure, to open a port leading to direct connections with a train-pipe and a brake-cylinder, substantially as described.

5. In a triple-valve device, the combination of a casing, a main valve working in a chamber of said casing, and an auxiliary valve in conjunction with said main valve actuated by the triple-valve piston to admit pressure from a train-pipe to a brake-cylinder or from a brake-cylinder to the atmosphere, substantially as described.

6. In a triple-valve device, the combination of a casing, an auxiliary valve working in a chamber of such casing, and actuated by the triple-valve piston to admit pressure from a train-pipe to a brake-cylinder or from the brake-cylinder to the atmosphere and a main valve adapted to admit pressure from an auxiliary reservoir to the brake-cylinder only after said admission of pressure from the train-pipe to the brake-cylinder by the auxiliary valve has been cut off, substantially as described.

7. In a brake mechanism, the combination of a train-pipe, an auxiliary reservoir, a brake-cylinder and a triple valve provided with a piston whose preliminary traverse in the direction required to apply the brakes admits pressure from the train-pipe to the brake-cylinder, whose further traverse in this direction acts to admit pressure from the auxiliary reservoir to the brake-cylinder and whose final traverse in this direction acts to release auxiliary pressure from a piston-valve and to actuate such valve to admit pressure from the train-pipe directly to the brake-cylinder, substantially as described.

8. In a triple-valve device, the combination of a casing, a piston working in a chamber of said casing, a valve independent of the emergency-valve, and actuated by the piston to admit pressure from a train-pipe to a brake-cylinder and from a brake-cylinder to the atmosphere, and an emergency-valve actuated by the piston to admit pressure from a train-pipe directly to a brake-cylinder, substantially as described.

9. In a triple-valve device, the combination of a casing, a piston provided with a stem and working in a chamber of said casing, a main valve, an auxiliary valve independent of the emergency-valve and actuated by the piston-stem to govern ports leading to connections with a train-pipe and a brake-cylinder, and with a brake-cylinder and the atmosphere, without necessarily moving the main valve and a piston-valve, normally held to its seat by auxiliary-reservoir pressure, and actuated by the piston-stem to open a port leading to direct connections with a train-pipe and a brake-cylinder when said valve is released of said auxiliary-reservoir pressure by its escape to the atmosphere, substantially as described.

10. In a triple-valve device, the combination of a casing, a piston provided with a stem and working in a chamber of said casing, a piston-valve normally held to its seat by pressure from an auxiliary reservoir, adapted to govern a port leading to direct connections with a train-pipe and a brake-cylinder and actuated by the piston-stem to open said port, a main valve actuated by the piston-stem to release such auxiliary pressure from said piston-valve by permitting it to escape to the atmosphere, and an auxiliary valve independent of the emergency-valve and actuated by the piston-stem to control ports leading to connections with a train-pipe and a brake-cylinder, and with a brake-cylinder and the atmosphere, without necessarily moving the main valve, substantially as described.

11. In a triple-valve device, the combination of a casing, a piston provided with a stem and working in a chamber of said casing, a piston-valve normally held to its seat by pressure from an auxiliary reservoir, adapted to govern a port leading to direct connections with a train-pipe and a brake-cylinder and actuated by the piston-stem to open said port, a check-valve interposed in the passage leading from such emergency-valve to a brake-cylinder, a main valve actuated by the piston-stem to release such auxiliary pressure from the piston-valve by permitting it to escape to the atmosphere and to open or close ports leading to connections with a train-pipe and a brake-cylinder and with a brake-cylinder and the atmosphere, without necessarily moving the main valve, substantially as described.

HENRY F. NOYES.

Witnesses:
 JENNIE LARSEN,
 F. H. SMITH.